(12) United States Patent
De Bree

(10) Patent No.: US 9,686,898 B2
(45) Date of Patent: Jun. 27, 2017

(54) TILLING DEVICE FOR TILLING GROUND SURFACES, AND A METHOD FOR TILLING GROUND SURFACES

(71) Applicant: REDEXIM HANDEL-EN EXPLOITATIE MAATSCHAPPIJ B.V., AC Zeist (NL)

(72) Inventor: Cornelius Hermanus Maria De Bree, Driebergen (NL)

(73) Assignee: REDEXIM HANDEL—EN EXPLOITATIE MAATSCHAPPIJ B.V., AC Zeist (NL)

( * ) Notice: Subject to any disclaimer, the term of this patent is extended or adjusted under 35 U.S.C. 154(b) by 77 days.

(21) Appl. No.: 14/653,985

(22) PCT Filed: Dec. 18, 2013

(86) PCT No.: PCT/EP2013/077249
§ 371 (c)(1),
(2) Date: Jun. 19, 2015

(87) PCT Pub. No.: WO2014/096108
PCT Pub. Date: Jun. 26, 2014

(65) Prior Publication Data
US 2015/0342108 A1    Dec. 3, 2015

(30) Foreign Application Priority Data
Dec. 21, 2012   (EP) .................................... 12199021

(51) Int. Cl.
*A01B 63/24* (2006.01)
*A01B 45/02* (2006.01)
(Continued)

(52) U.S. Cl.
CPC ............ *A01B 45/023* (2013.01); *A01B 63/26* (2013.01); *A01B 63/32* (2013.01)

(58) Field of Classification Search
CPC ..... A01B 45/02; A01B 45/023; A01B 45/026; A01B 63/111; A01B 63/24
(Continued)

(56) References Cited

U.S. PATENT DOCUMENTS 2,302,944 A * 11/1942 Helbig ................. A01B 45/023
  111/99
4,867,244 A    9/1989 Cozine et al.
(Continued)

FOREIGN PATENT DOCUMENTS

EP    1210853 A1   6/2002
EP    2 070 402 A1  6/2009

OTHER PUBLICATIONS

International Search Report dated Apr. 4, 2014 from corresponding International Application No. PCT/EP2013/077249; 6 pgs.

*Primary Examiner* — Gary Hartmann
(74) *Attorney, Agent, or Firm* — Maier & Maier, PLLC

(57) ABSTRACT

A tilling device for tilling ground surfaces, in particular lawn surfaces, comprising at least one machine frame, at least one supporting device which supports the machine frame on the ground, multiple tools which can be lifted and lowered relative to the machine frame and thus can dig into the ground and be pulled out again, and at least one adjusting device which adjusts the distance between the supporting device and the machine frame in the vertical direction in order to adjust the digging depth of the tools into the ground. The adjusting device additionally adjusts the distance between the supporting device and the tools.

15 Claims, 6 Drawing Sheets

(51) Int. Cl.
  *A01B 63/26* (2006.01)
  *A01B 63/32* (2006.01)
(58) Field of Classification Search
  USPC .................................. 172/21, 22, 97, 98, 92
  See application file for complete search history.

(56) References Cited

U.S. PATENT DOCUMENTS

| | | | | |
|---|---|---|---|---|
| 4,926,947 A * | 5/1990 | Cozine | ................ | A01B 45/023 172/22 |
| 5,398,767 A * | 3/1995 | Warke | ................ | A01B 45/023 172/125 |
| 6,712,155 B1 * | 3/2004 | Dufty | ................ | A01B 45/026 172/150 |
| 8,056,645 B2 * | 11/2011 | De Bree | ............ | A01B 45/023 172/21 |
| 8,485,272 B2 * | 7/2013 | De Bree | ............ | A01B 45/023 172/125 |
| 8,561,713 B2 * | 10/2013 | De Bree | ............ | A01B 45/023 172/125 |
| 8,616,296 B2 * | 12/2013 | De Bree | ............ | A01B 45/023 172/125 |
| 9,357,687 B2 * | 6/2016 | St. Romain | .......... | A01B 45/023 |
| 2002/0189825 A1 * | 12/2002 | Livingstone | ............ | F16H 37/12 172/21 |
| 2005/0178567 A1 * | 8/2005 | Wiedenmann | ......... | A01B 71/06 172/21 |
| 2008/0257571 A1 * | 10/2008 | Keane | ................ | A01B 45/023 172/21 |
| 2015/0342109 A1 * | 12/2015 | De Bree | ............ | A01B 45/023 172/1 |

* cited by examiner

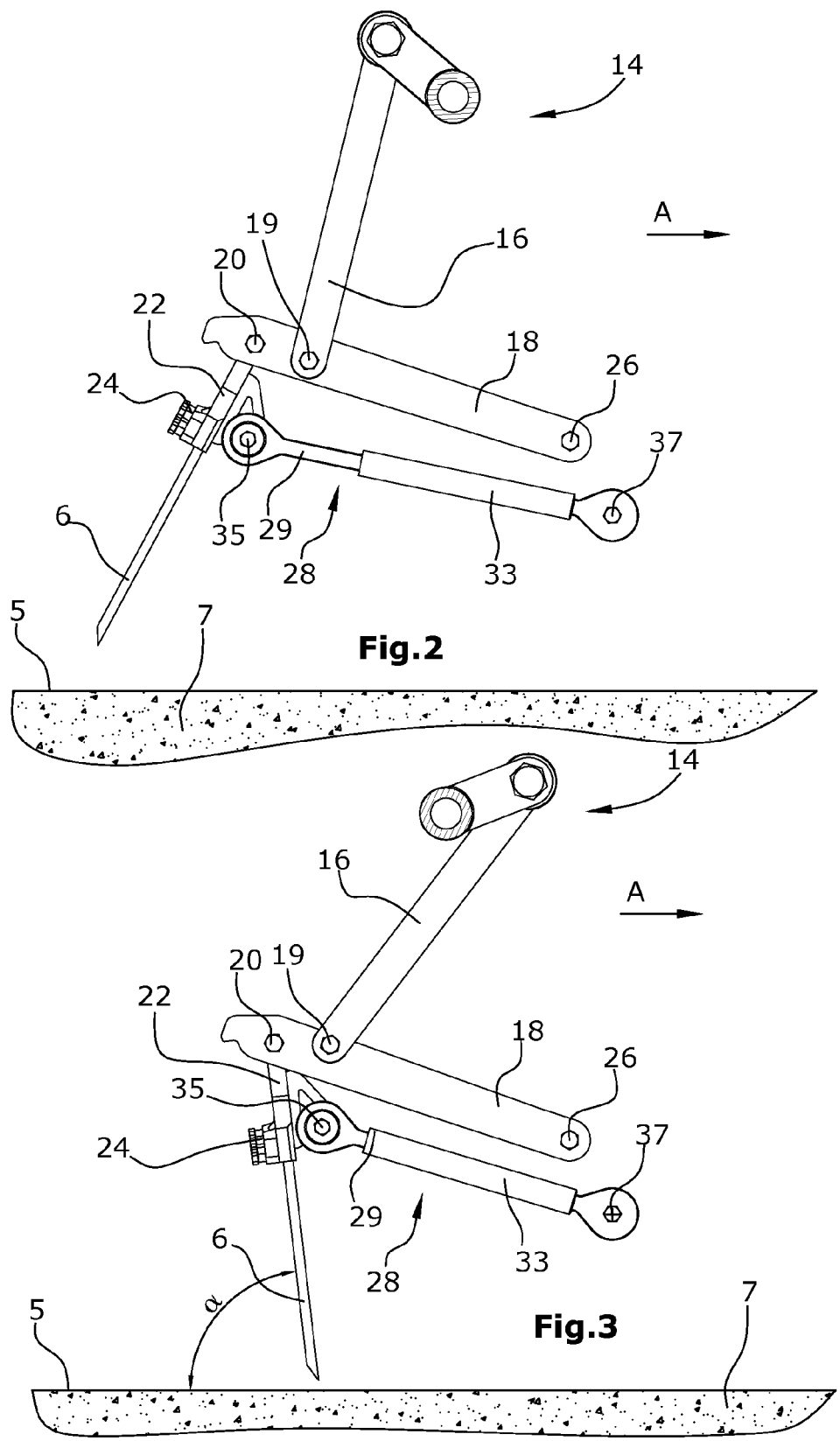

TILLING DEVICE FOR TILLING GROUND SURFACES, AND A METHOD FOR TILLING GROUND SURFACES

BACKGROUND

The invention relates to a tilling device for tilling ground surfaces, as well as to a method for tilling ground surfaces.

Tilling devices are known from prior art that comprise at least one support device, such as a roll or wheels, for example, which supports a machine frame on the ground. A plurality of piercing tools is provided, which tools are coupled with the machine frame and are adapted to be moved up and down relative to the machine frame, whereby they can be pushed into and pulled from the ground. Further, an adjustment device is frequently provided that adjusts the distance between the support means and the machine frame in the height direction in order to adjust the depth of the penetration of the tools into the ground.

From the European Patent Publication EP-A-0037595, a tilling device is known which has two carrying arms guided in a parallelogram-like manner, one end of which pivotably holding a tool holder, whereas the other end is pivotably supported at the machine frame. A pushrod of a crank drive is hinged to the tool holder and drives the same, so that the tool holder performs an up-and-down movement. One of the two carrying arms is variable in length and comprises a stop spring means. As long as the piercing tool is outside the soil, the carrying arm rests on the stop due to the force of the spring. With the piercing tool pushed into the ground and the tilling device moving forward, the tool and the tool holder pivot against the traveling direction and the length-variable carrying arm is extended against the spring force.

However, there is a disadvantage that in case of an uneven, in particular bumpy surface and with a small piercing depth, the tools partly do not pierce the ground, whereby a part of the ground cannot be worked.

SUMMARY

It is an object of the present invention to provide a tilling device and a method for tilling a ground surface, which allow different ground surfaces to be worked by means of the tools even with a small piercing depth.

The object is achieved with the features described herein.

The invention advantageously provides that the adjustment means also adjusts the distance between the support means and the tools.

This has the advantage that, depending on the ground surface, the distance between the support means and the tools can be adjusted such that the tools can be pushed into the ground even when the piercing depth is small.

When the distance between the support means and the machine frame is increased, the distance between the support means and the tools can be reduced by means of the adjustment means.

In particular, this has the advantage that in case of a large distance between the support means and the machine frame, i.e. in case of a small piercing depth, the distance between the support means and the tools can be small. This means that even with an uneven, in particular bumpy ground, the support means on which the machine frame is supported can follow the ground surface exactly, and that owing to the fact that a small distance exists between the tools and the support means, the tools can still be pushed into the ground although the piercing depth may be small.

When the distance between the support means and the machine frame is reduced, the distance between the support means and the tools may be increased by means of the adjustment means.

The adjustment means may be driven hydraulically, mechanically or pneumatically.

The adjustment means is adapted to adjust the support means via a linkage.

The linkage may comprise a first pivot arm, wherein the support means is arranged at the free end of the first pivot arm and the first pivot arm is adapted to be pivoted by means of the adjustment means.

The linkage may comprise a second pivot arm which has a first end hingedly coupled with the adjustment means and has a second end hingedly coupled with the machine frame, wherein the first pivot arm, at which the support means is arranged, is hingedly coupled with the second pivot arm. By pivoting the second pivot arm by means of the adjustment means, the first pivot arm is also pivoted, whereby the support means can be adjusted.

By pivoting the support means, the support means can be adjusted in a vertical direction and in a horizontal direction at the same time. The horizontal direction is substantially parallel to the traveling direction. The vertical direction is substantially orthogonal to the ground surface. In particular, the distance between the support means and the machine frame is adjusted by adjusting the support means in the vertical direction. By adjusting the support means in the horizontal direction, it is in particular the distance between the support means and the tools that is adjusted.

The support means may comprise at least one wheel, one roller or one roll, whose axis extends in a direction that is orthogonal to the traveling direction and parallel to the ground surface to be worked. The axial length of the roller or roll may substantially be as long as the tilling device is wide, and the width of the tilling device is measured in a direction that is orthogonal to the traveling direction and substantially parallel to the ground surface.

The tools may be arranged side by side in a direction orthogonal to the traveling direction and substantially parallel to the ground surface to be worked.

In order to adjust the distance between the tools and the support means, the adjustment means can adjust the support means in a direction substantially parallel to the traveling direction.

The support means may be arranged in front of the tools, seen in the traveling direction.

When increasing the distance between the support means and the tools, the adjustment means is adapted to adjust the support means in the traveling direction.

When reducing the distance between the support means and the tools, the adjustment means is adapted to adjust the support means in a direction opposite the traveling direction.

Further, according to the present invention, a method for tilling a ground surface is known, which includes the following method steps:
- pulling or driving a machine frame of a tilling device over a ground surface, the machine frame being supported on at least one support means,
- pushing and pulling tools into and from the ground surface, the tools being coupled with the machine frame,
- adjusting the distance between the at least one support means of the tilling device and the machine frame of the tilling device in order to adjust the piercing depth of the tools into the ground.

Advantageously, it is provided that when the distance between the at least one support means and the machine frame is adjusted, the distance between the support means and the tools is adjusted at the same time.

This has the advantage that the distance between the tools and the support means can be adjusted as a function of the piercing depth and the ground surface so that it can be ensured that the tools will always pierce the ground.

When the distance between the at least one support means and the machine frame is increased, the distance between the support means and the tools can be reduced, and when the distance between the at least one support means and the machine frame is reduced, the distance between the support means and the tools can be increased.

The following is a detailed explanation of embodiments of the invention with reference to the drawings.

BRIEF DESCRIPTION OF THE FIGURES

The Figures schematically show.

DETAILED DESCRIPTION

Figure 1:
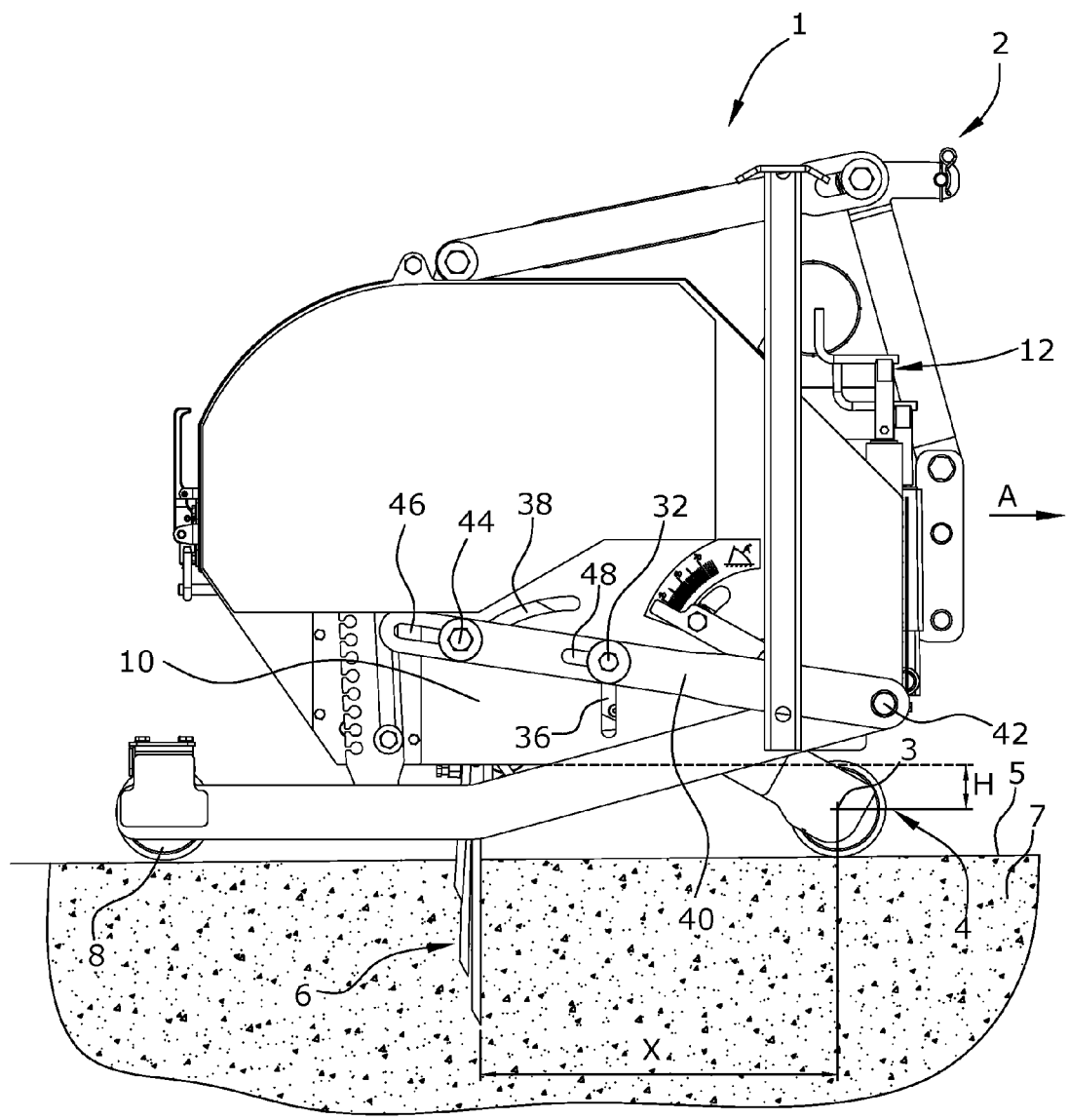
FIG. 1 a side elevational view of a tilling device,
FIG. 2 a schematic side elevational view of the drive,
FIG. 3 the schematic view of FIG. 2 in another position,
FIG. 4 the tilling device in FIG. 1 with a view to the inner side of the machine frame,
FIG. 5 the tilling device in FIG. 4 with the support means adjusted,
FIG. 6 a side elevational view on the embodiment in FIG. 5 showing the inner side of the machine frame,
FIG. 7 a rear view on the tilling device in FIG. 1,
FIG. 8 a perspective view of a tilling device.

FIG. 1 is a side elevational view on a tilling device 1. The tilling device 1 comprises a coupling means 2 by which the tilling device 1 can be coupled with a towing vehicle and can be towed by the towing vehicle.

The tilling device 1 has a machine frame 10 supported on the ground 7 or the ground surface 5 by means of a support means 4. The support means 4 may be at least one wheel, one roller or one roll. Preferably, the support means 4 is a roller or roll extending across the width of the tilling device 1. The tilling device 1 is towed in the traveling direction A. The wheel axle 3 of a roller or roll serving as the support means 4 is substantially orthogonal to the traveling direction A and parallel to the ground surface 5.

Tools 6 are coupled to the machine frame 10, which tools can be moved up and down with respect to the machine frame 10 and can thereby be pushed into the ground 7 and be pulled therefrom. The tools 6 are piercing tools.

FIGS. 2 and 3 schematically illustrate the drive for moving the tools 6 up and down. The tilling device 1 has a crank drive 14 which drives a pivot arm 18 via a pushrod 16. At a first end, the pivot arm 18 is supported at the machine frame 10, not illustrated in FIGS. 2 and 3, so as to be pivotable about a first pivot axis 26. The pivot arm 18 is adapted to be pivoted about the first pivot axis 26 by means of the crank drive 14 and the pushrod 16 and to thereby perform an up-and-down movement. During the up-and-down movement, the tools 6, which are piercing tools, can be pushed into and be pulled from the ground 7. At the second end of the pivot arm 18 opposite the first end of the pivot arm 18, a tool holder 22 is arranged that is hingedly supported around a pivot axis 20, the tool holder also performing an up-and-down movement due to the up-and-down movement of the pivot arm 18. The tool holder 22 is provided with at least one tool 6, preferably a set of tools 6, which is connected with the tool holder 22 via a fastening means 24.

Besides the pivot arm 18, a return means 28 is provided which, on the one hand, is supported at the machine frame 10 so as to be pivotable about a pivot axis 37 and which, on the other hand, is supported at the tool holder 22 so as to be pivotable about a pivot axis 35. The return means 28 is a piston cylinder unit. The cylinder element 33 is hingedly connected with the machine frame 10 via the pivot axis 37. The piston unit is a piston rod 29 hingedly connected with the tool holder 22 via the pivot axis 35. In the cylinder element 33, a compression spring is arranged which is compressed when the piston rod 29 is drawn from the cylinder element 33 in a telescopic manner, and which exerts a restoring force on the piston rod 29 and thus on the tool holder 22. Moreover, a damper element is arranged in the cylinder element 33, against which the piston rod 29 abuts after the piston rod 29 has been pulled back into the home position in the cylinder unit 33.

In FIG. 3, the embodiment illustrated in FIG. 2 is shown immediately before the piercing tool 6 pierces the ground 7. Immediately before piercing the ground 7, the tool 6 is in a home position. In this home position, the tool 6 is oriented under a piercing angle $\alpha$ with respect to the ground surface 5. In this position, the piston rod 29 contacts the damping element within the cylinder element 33. When the ground 7 is pierced, the tilling device 1 is advanced in the traveling direction A. In doing so, the tool 6 is pivoted about the pivot axis 20 against the restoring force of the return spring 28. Thus, the ground 7 is tilled. The tool 6 is moved upward again by the crank drive 14 and is thus pulled from the ground 7 again. After having been pulled from the ground 7, the tool 6 is pivoted back into the home position again due to the restoring force exerted by the return means 28 on the tool holder 22 and thus on the piercing tool 6.

Figure 4:
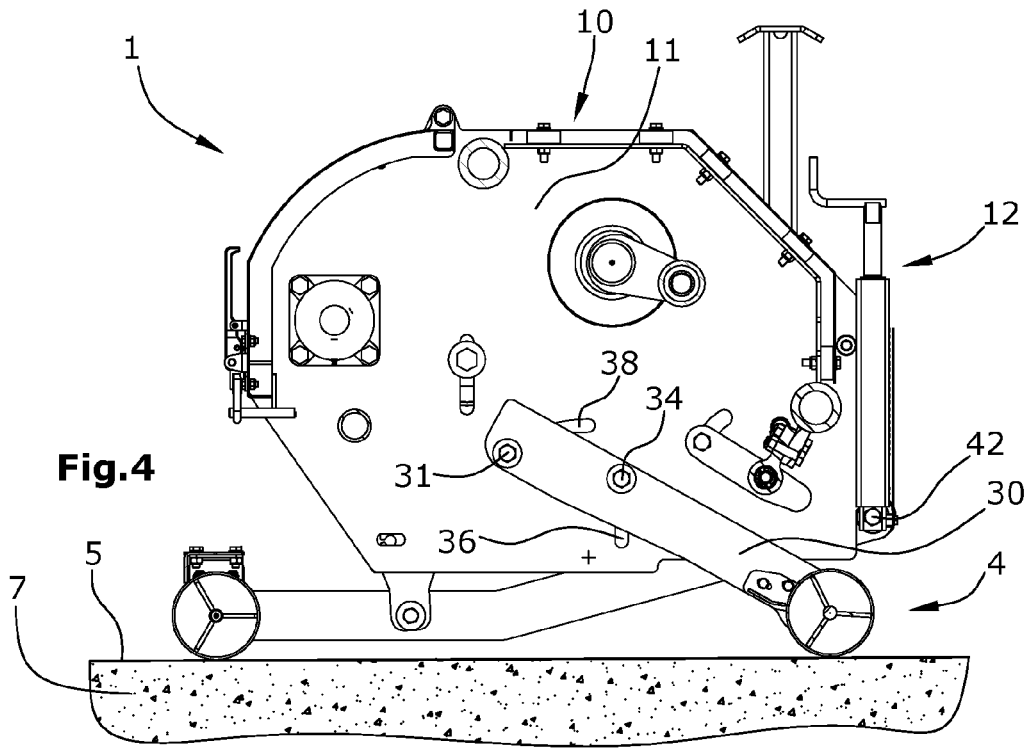

FIG. 4 illustrates the embodiment in FIG. 1, with the illustration showing the inner side of the side wall 11 of the machine frame 10. Therefore, this view does not show the piercing tools 6.

The support means is adjusted by means of an adjustment means 12 via a linkage. The linkage has a first and a second pivot arm 30, 40. The support means 4 is arranged at least at the first pivot arm 30 which is arranged on the inner side of the side wall 11 of the machine frame 10 and is pivotable with respect to the machine frame 10.

The first pivot arm 30 is pivotable about a first hinge 31 and a second hinge 34, the hinges 31 and 34 being adapted to be guided along elongated holes 38 and 36 provided in the side wall 11 of the machine frame 10.

As illustrated in FIG. 1, the tilling device 1 comprises an adjustment means 12. The adjustment means 12 illustrated is a mechanical adjustment means. However, the adjustment means 12 may also be a pneumatic or a hydraulic adjustment means. As can be seen in FIG. 1, the second pivot arm 40 is coupled with the adjustment means 12 via a hinge 42 at the lower end of the adjustment means 12. By means of the adjustment means 12, the hinge 42 of the second pivot arm 40 can be adjusted in the vertical direction, i.e. a direction that is substantially orthogonal to the ground surface 5. At the second end of the second pivot arm 40 opposite the first end, the second pivot arm 40 is hingedly coupled with the machine frame 10 via a hinge element 44. Owing to an elongated hole 46 provided in the second pivot arm 40, the second pivot arm 40 can move relative to the hinge element 44 so that, at a second end, the second pivot arm 40 is coupled with the machine frame 10 in a hinged and length-variable manner.

The second pivot arm 40 is further coupled with the second hinge 34 of the first pivot arm 30 via the hinge 32. The second pivot arm 40 can be moved relative to the hinge 32 due to an elongated hole 48 in the second pivot arm 40.

When the hinge 42 of the second pivot arm 40 is adjusted by means of the adjustment means 12, the hinge 42 is moved in the direction of the ground surface 5. In doing so, the second pivot arm 40 pivots about the axis of the hinge 42. Further, the second pivots arm pivots about the axes of the hinges 44 and 32. When the hinge 42 is guided down towards the ground surface 5, the second pivot arm 40 is moved so that the second pivot arm 40 and thus the elongated holes 46 and 48 are moved relative to the hinges 44 and 32. Further, the hinge 32 is guided in the elongated hole 36 of the machine frame 10 towards the ground surface 5. Since the hinge 32 of the second pivot arm 40 and the hinge 34 of the first pivot arm 30 are coupled with each other, also the hinge 34 of the first pivot arm 30 is guided along the elongated hole 36 towards the ground surface. Owing to the forced guiding of the hinge 31 of the first pivot arm 30 in the elongated hole 38 of the machine frame 10, the first pivot arm 30, and thus the support means 4, is pivoted.

As it is pivoted, the support means 4 is moved, on the one hand, in a direction that is orthogonal to the ground surface 5 and, on the other hand, it is moved in a direction that is parallel to the traveling direction. The support means 4 is thus adjusted both in the vertical and in the horizontal direction. When the hinge 42 is adjusted towards the ground 7, the distance H between the support means 4 and the machine frame 10 is increased, i.e. the piercing depth is reduced, and the distance X between the support means 4 and the tools 6 is reduced.

Figure 5:
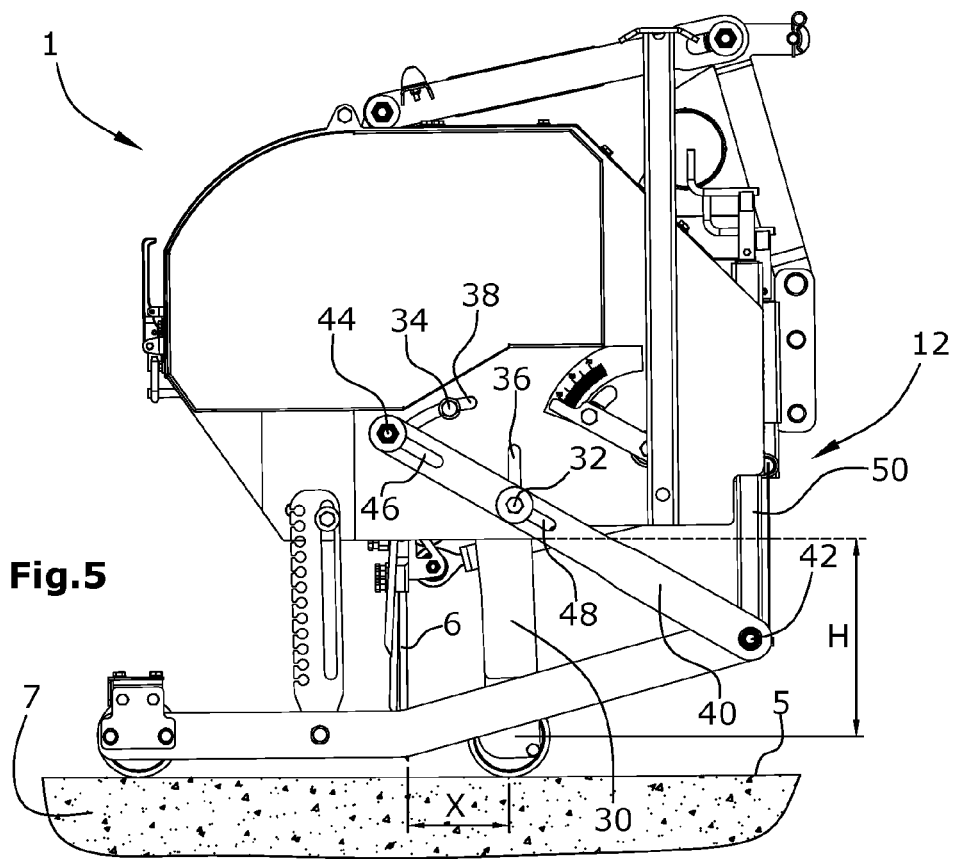
Figure 6:
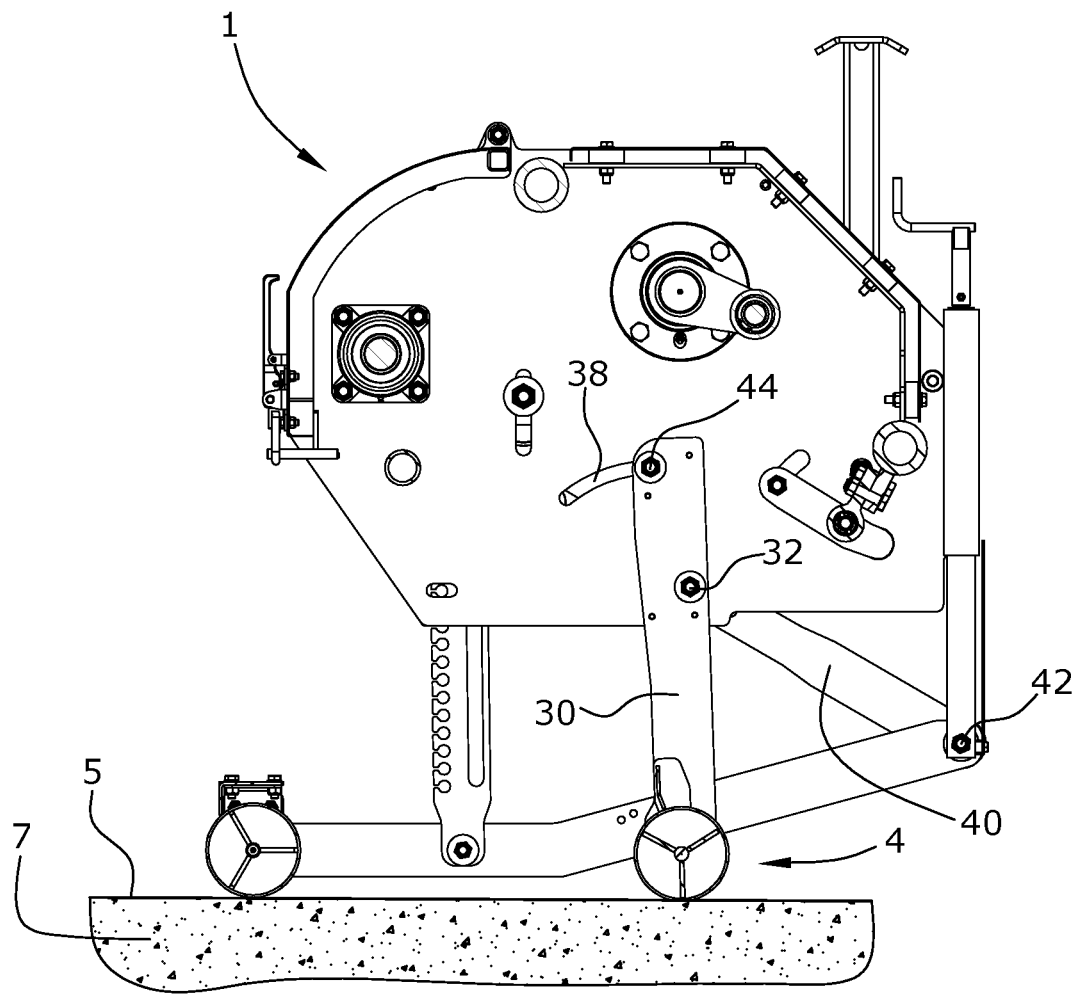

FIGS. 5 and 6 illustrate a pivoted support means 4. The support means 4 has been pivoted such that the distance H between the support means 4 and the machine frame 10 has increased and, simultaneously, the distance X between the support means 4 and the tools 6 has been reduced. With a large distance H between the support means 4 and the machine frame 10, the piercing depth of the tolls 6 into the ground 7 is small. Since the tools 6 are coupled with the machine frame 10, the piercing depth of the tools 6 into the ground 7 is reduced when the distance H between the support means 4 and the machine frame 10 is increased.

Due to the fact that, when the piercing depth of the tools 6 into the ground 7 is smaller, the support means 4 is arranged closer to the tools 6, it is possible for the tools 6 to pierce the ground 7 even when the ground surface 5 is uneven or bumpy.

At the side wall 53 of the machine frame 10 of the tilling device 1, opposite the side wall 11, another linkage with a first and a second pivot arm 30, 40 as well as elongated holes 36, 38, 46, 48 and hinges 42, 44, 31, 32, 34, 44 and another adjustment means 12 is arranged so that the support means 4, which is configured as a roll extending across the entire width of the tilling device 1, can be adjusted uniformly at both ends.

The support means 4 could also be adjusted in a different manner, wherein, in any case, the distance X between the support means 4 and the tools 6 is adjusted simultaneously or consecutively when the distance H between the support means 4 and the machine frame 10 is adjusted.

Figure 7:
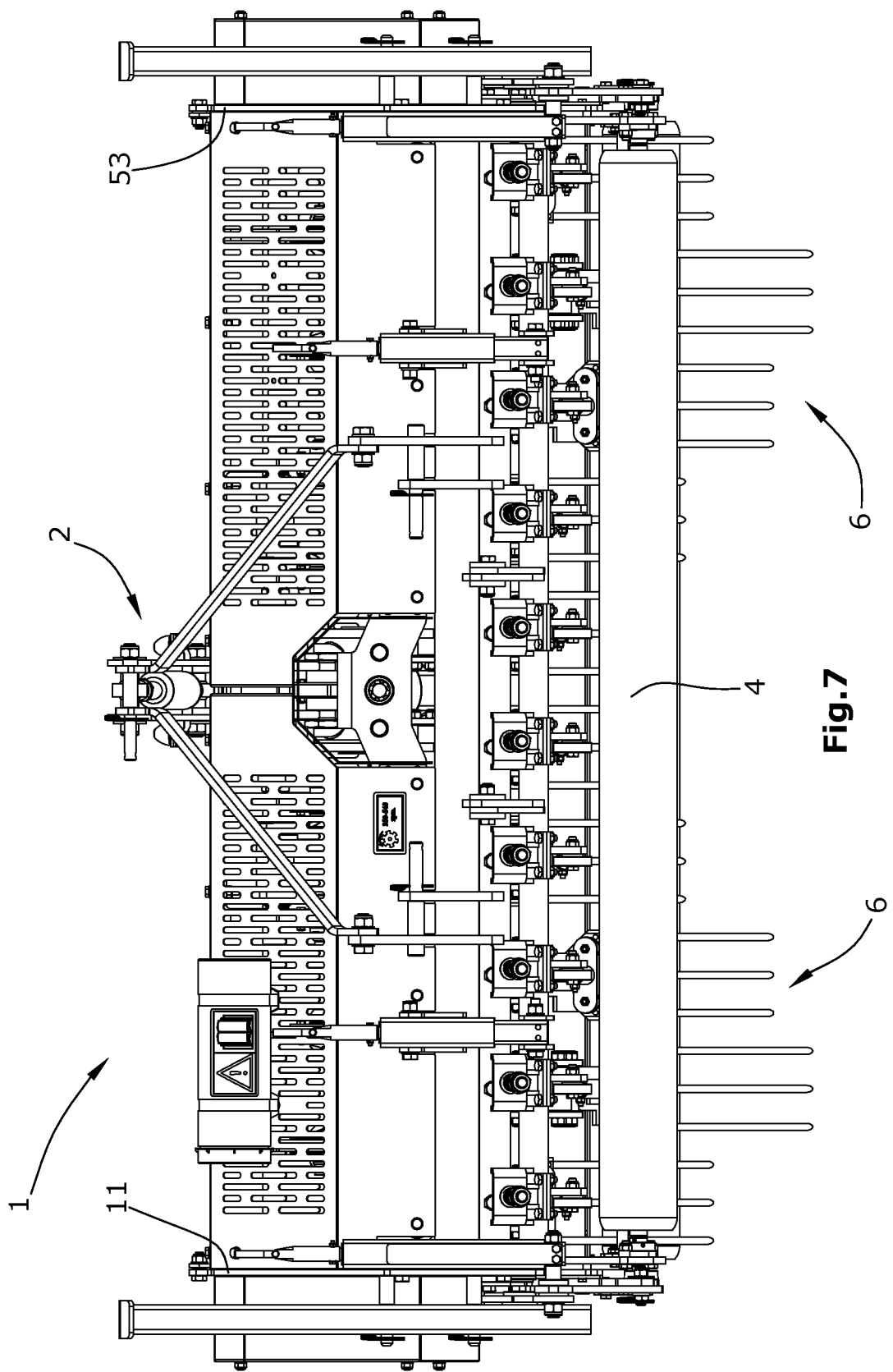

Preferably, the tools 6 are arranged side by side in a direction that is orthogonal to the traveling direction A and substantially parallel to the ground surface 5. In the embodiment illustrated, a set of tools 6 is respectively arranged at a respective tool holder 22 which is adapted to be moved up and down via a respective pushrod 16, a crank drive 14 and a pivot arm 18, as well as a return means 28, whereby the set of tools can be pushed into and pulled from the ground, with the tools 6 being adapted to be pivoted in the ground 7. The tools 6 are arranged side by side and are illustrated in more detail in FIG. 7. Further, FIG. 7 shows that a roll 8 is arranged behind the tools 6, seen in the traveling direction A, which roll smoothes the ground tilled by means of the tools 6. However, the roll 8 is not a part of the support means, but is merely arranged in a pivotable manner at the hinge 42 of the adjustment means 12 via a pivot arm 50.

Figure 8:
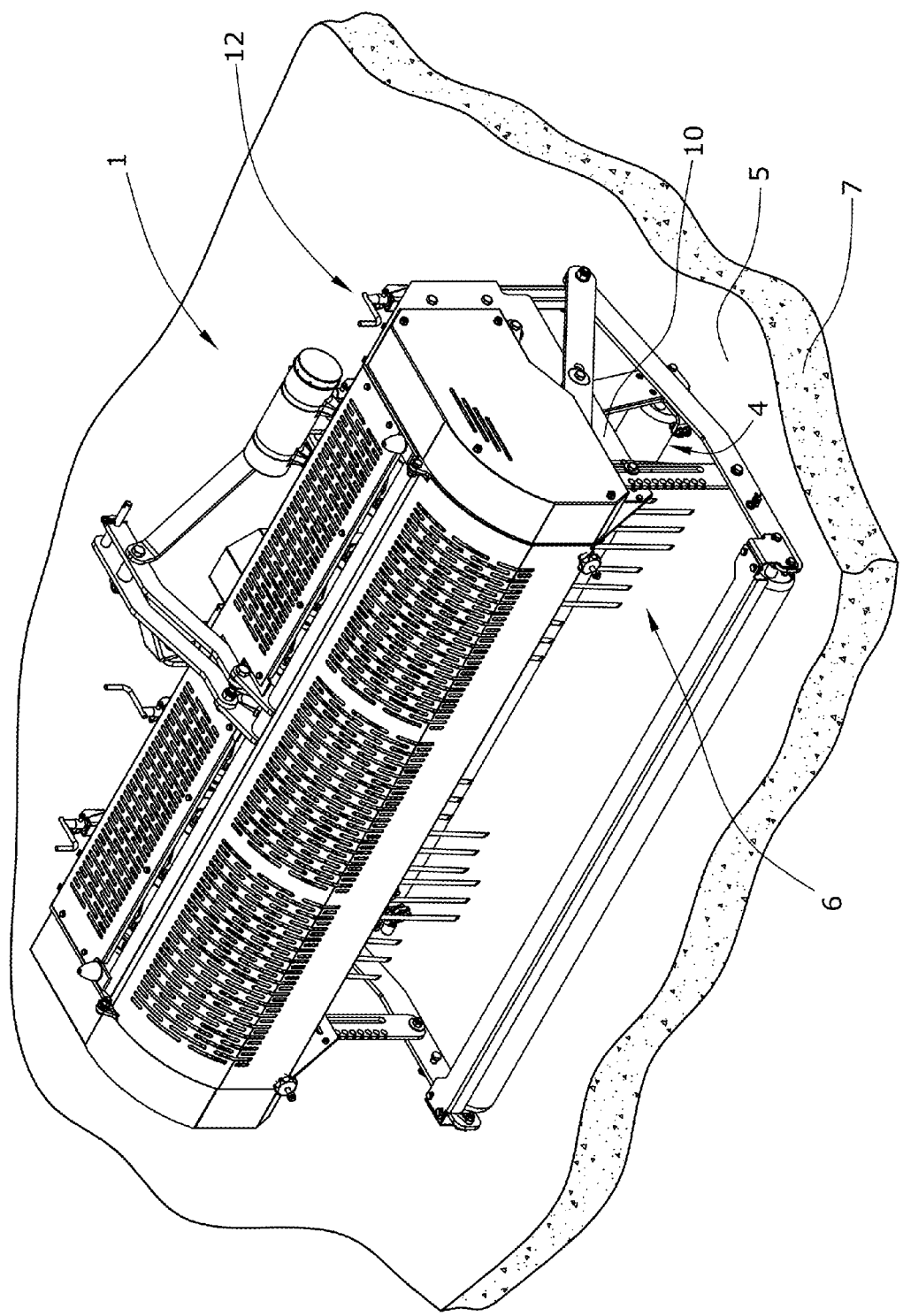

FIG. 8 shows a perspective view of an exemplary embodiment of a tilling device 1. In an exemplary embodiment, a tilling device 1 may include an adjustment means 12, tools 6 being adapted to be pushed into, pulled from, and/or pivoted into the ground 7, a support means 4 (such as a wheel axle) substantially orthogonal to the traveling direction and parallel to the ground surface 5, and a machine frame 10.

The invention claimed is:

1. A tilling device for tilling ground surfaces, comprising:
at least one machine frame,
at least one support means supporting the machine frame on the ground,
a plurality of tools adapted to be moved up and down with respect to the machine frame, whereby they are adapted to be pushed into and pulled from the ground,
at least one adjustment means that adjusts the distance between the support means and the machine frame in the vertical direction in a working position in order to adjust the piercing depth of the tools into the ground, wherein the adjustment means also adjusts the distance between the support means and the tools in the working position.

2. The tilling device of claim 1, wherein the distance between the support means and the tools can be reduced by the adjustment means as the distance between the support means and the machine frame is increased.

3. The tilling device of claim 1, wherein the distance between the support means and the tools can be increased by the adjustment means as the distance between the support means and the machine frame is reduced.

4. The tilling device of claim 1, wherein the adjustment means can be driven hydraulically, mechanically or pneumatically.

5. The tilling device of claim 1, wherein the adjustment means adjusts the support means by means of a linkage.

6. The tilling device of claim 5, wherein the linkage comprises a first pivot arm, the support means being arranged at the free end of the first pivot arm, and the first pivot arm being pivotable by means of the adjustment means.

7. The tilling device of claim 1, wherein the linkage comprises a second pivot arm having a first end hingedly coupled with the adjustment means and a second end hingedly coupled with the machine frame, wherein the first pivot arm, at which the support means is arranged, is hingedly coupled with the second pivot arm.

8. The tilling device of claim 1, wherein the at least one support means comprises at least one wheel, one roller or one roll, the axis of which extends in a direction that is orthogonal to the traveling direction and parallel to the ground surface to be worked.

9. The tilling device of claim 1, wherein the tools are arranged side by side in a direction that is orthogonal to the traveling direction and parallel to the ground surface to be worked.

10. The tilling device of claim 1, wherein for an adjustment of the distance between the tools and the support means, the adjustment means adjusts the support means in a direction that is substantially orthogonal to the traveling direction.

11. The tilling device of claim 1, wherein the support means is arranged in front of the tools, seen in the traveling direction.

12. The tilling device of claim 11, wherein the adjustment means adjusts the support means in the traveling direction as the distance between the support means and the tools is increased.

13. The tilling device of one of claim 11, wherein the adjustment means adjusts the support means opposite to the traveling direction as the distance between the support means and the tools is reduced.

14. A method for tilling a ground surface comprising:
pulling or driving a machine frame of a tilling device over a ground surface, the machine frame being supported on at least one support means,
pushing and pulling tools into and from the ground surface, the tools being coupled with the machine frame, and
adjusting the distance between the at least one support means of the tilling device and the machine frame of the tilling device in a working position in order to adjust the piercing depth of the tools into the ground, wherein when the distance between the at least one support means and the machine frame is adjusted, the distance between the support means and the tools is adjusted at the same time in the working position.

15. The method of claim 14, wherein when the distance between the at least one support means and the machine frame is increased, the distance between the support means and the tools is reduced, and when the distance between the at least one support means and the machine frame is reduced, the distance between the support means and the tools is increased.

* * * * *